US010514145B1

(12) United States Patent
Orisich et al.

(10) Patent No.: US 10,514,145 B1
(45) Date of Patent: Dec. 24, 2019

(54) OPTICAL SYSTEMS FOR A HEADLAMP

(71) Applicant: VALEO NORTH AMERICA, INC., Troy, MI (US)

(72) Inventors: John Orisich, Seymour, IN (US); Brant Potter, Seymour, IN (US); Ambroise Servantie, Seymour, IN (US)

(73) Assignee: VALEO NORTH AMERICA, INC., Troy, MI (US)

( * ) Notice: Subject to any disclaimer, the term of this patent is extended or adjusted under 35 U.S.C. 154(b) by 0 days.

(21) Appl. No.: 16/226,777

(22) Filed: Dec. 20, 2018

(51) Int. Cl.
| | |
|---|---|
| *B60Q 3/00* | (2017.01) |
| *F21S 41/67* | (2018.01) |
| *B60Q 1/14* | (2006.01) |
| *F21S 41/141* | (2018.01) |
| *F21S 41/32* | (2018.01) |
| *F21S 41/14* | (2018.01) |

(52) U.S. Cl.
CPC ............ *F21S 41/67* (2018.01); *B60Q 1/1415* (2013.01); *F21S 41/141* (2018.01); *F21S 41/14* (2018.01); *F21S 41/322* (2018.01)

(58) Field of Classification Search
CPC ......... F21S 41/14; F21S 41/141; F21S 41/322
USPC .................................. 362/459, 460, 487, 516
See application file for complete search history.

(56) References Cited

U.S. PATENT DOCUMENTS

| | | | |
|---|---|---|---|
| 9,227,555 B2 * | 1/2016 | Kalapodas | ............. B60Q 1/085 |
| 2009/0168428 A1 | 7/2009 | Huang | |
| 2014/0241000 A1 * | 8/2014 | Matsumoto | .......... B60Q 1/0041 362/512 |
| 2017/0067609 A1 * | 3/2017 | Ichikawa | ............. B60Q 1/0041 |

FOREIGN PATENT DOCUMENTS

| | | |
|---|---|---|
| EP | 1 884 708 A1 | 2/2008 |
| EP | 2 966 341 A1 | 1/2016 |

* cited by examiner

*Primary Examiner* — Thuy V Tran
(74) *Attorney, Agent, or Firm* — Oblon, McClelland, Maier & Neustadt, L.L.P.

(57) ABSTRACT

A headlamp assembly, an optical system and a method for generating a hybrid luminous intensity are provided. The headlamp includes a low beam assembly and a high beam assembly. The low beam assembly is configured to generate a low beam distribution. The low beam assembly includes a plurality of low beam modules including at least one high luminance source optically configured to emit a first luminous intensity distribution and at least one light source optically configured to emit a second luminous intensity distribution. The high beam assembly includes one or more high beam modules.

17 Claims, 13 Drawing Sheets

OPTICAL SYSTEMS FOR A HEADLAMP

BACKGROUND

This invention relates to the domain of lighting for a motor vehicle. More specifically, the invention relates to an optical system for a headlamp.

Motor vehicles contain numerous lighting devices for both interior and exterior illumination. For example, exterior vehicle lighting devices may perform stop lamp functions, tail lamp functions, headlamp functions, daytime running light functions, dynamic bending light functions, and fog lamp functions.

Most states, countries, or regions which utilize motor vehicles have various requirements and standards that a vehicle must adhere to in order to legally use roadways. For example, Federal Motor Vehicle Safety Standard (FMVSS) No. 108 specifies various maximum and minimum photometric intensity values (based on angle) for headlamps on vehicles operated within the Unites States.

The Insurance Institute for Highway Safety (IIHS) in the United States has its own set of tests and ratings (Headlight Test and Rating Protocol) for headlamp performance. The IIHS tests and ratings seek to encourage manufacturers to improve the illumination performance in actual on-road use.

IIHS evaluations have shown that the on-road illumination provided by vehicle headlamps varies widely. In addition, IIHS has rated the majority of headlamps in a poor category (e.g. insufficient illumination, excessive glare, etc.). The IIHS testing protocol tests headlamp for 5 curve conditions: 1/150 meter radius Left curve, 2/250 meter radius Left curve, 3/Straight roadway, 4/250 meter Right curve, and 5/150 meter Right curve.

In recent years, vehicle lighting has also become important for its aesthetic appeal to consumers. It may be technically challenging to provide aesthetically appealing vehicle lighting devices while also meeting the necessary cost, technology, and regulatory requirements. For example, reducing lens's height for lighting modules requires using LEDs with higher luminance ($cd/mm^2$) than conventional products to meet regulation requirements at the testing points.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

Embodiments described herein include the following aspects.

The present disclosure relates to a headlamp. The headlamp includes a low beam assembly configured to generate a low beam distribution. The low beam assembly includes a plurality of low beam modules including at least one high luminance source optically configured emit a first luminous intensity distribution and at least one light source optically configured to emit a second luminous intensity distribution; and a high beam assembly configured to generate a high beam distribution. The high beam assembly includes one or more high beam modules.

In one aspect, a focal length of each optical system associated with the plurality of low beam modules and the one or more high beam modules is less than 6 mm.

In one aspect, the first luminous intensity distribution includes a maximum intensity hot spot region.

In one aspect, a lens height associated with each of the modules is in a range from 1 mm to 20 mm.

In one aspect, a first low beam module of the plurality of low beam modules includes a folder having a bump.

In one aspect, the bump has a spherical shape.

In one aspect, the bump has a triangular shape.

In one aspect, a second low beam module of the plurality of low beam modules includes a file.

In one aspect, the first low beam module includes a first high luminance source and a second high luminance source.

In one aspect, the first low beam module includes a reflector having two optical cavities adapted to hold the first high luminance source and the second high luminance source.

In one aspect, the at least one high luminance source is a high luminance light emitting diode.

The present disclosure also relates to an optical system for a headlamp. The optical system includes a first optical system including at least one high luminance source optically configured to emit a first luminous intensity distribution; a second optical system including at least one source optically configured to emit a second luminous intensity distribution; and a third optical system configured to generate a high beam distribution.

The present disclosure also relates to a method of generating a hybrid luminous intensity distribution. The method includes emitting a first luminous intensity distribution via a high luminance source of a first low beam module; emitting a second luminous intensity distribution via at least one light source of a second low beam module; and emitting a third luminous intensity distribution via a high beam assembly.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in the specification, but rather is defined by the claims.

In the interest of clarity, not all of the features of the implementations described herein are shown and described in detail. It will be appreciated that in the development of any such actual implementation, numerous implementation-specific decisions will be made in order to achieve the developer's specific goals, such as compliance with application- and business-related constraints, and that these specific goals will vary from one implementation to another and from one developer to another.

Referring now to the drawings, wherein like reference numerals designate identical or corresponding parts throughout several views, the following description relates to an optical system for a headlamp. The headlamp provides a beam pattern that conforms to society of automotive engineers (SAE), economic commission for Europe (ECE) standards, China compulsory certification (CCC) standard, and/or any other country having lighting regulations as would be understood by one of ordinary skill in the art.

Figure 1:
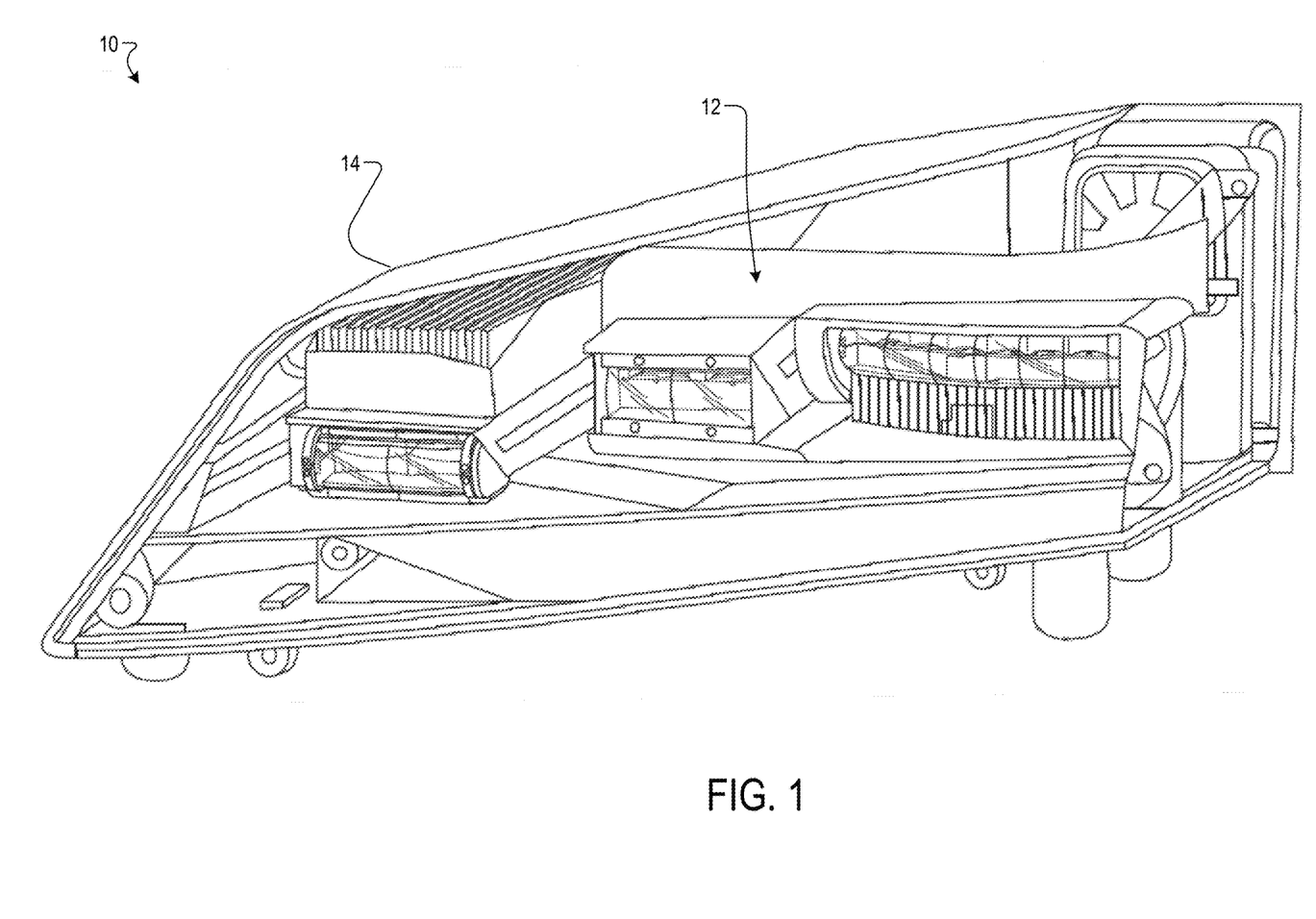
FIG. 1 is a schematic of a headlamp assembly according to one example.
Figure 2:
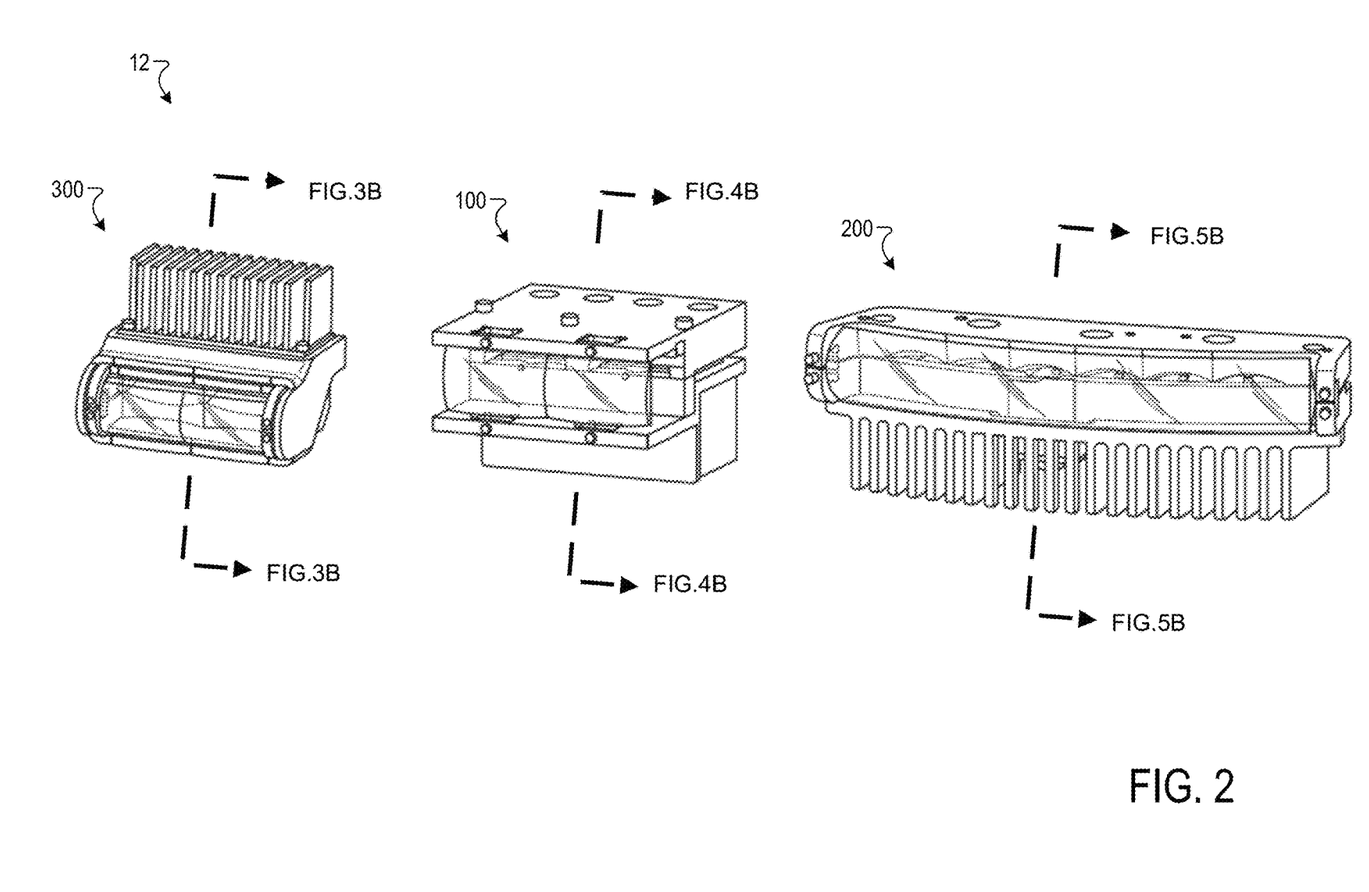
FIG. 2 is a schematic that shows an exploded view of an optical system of the headlamp assembly according to one example.

FIG. 1 is a schematic of a headlamp assembly 10 according to one example. The headlamp assembly 10 includes an optical system 12 and an enclosure 14. An exploded view of the headlamp assembly is shown in FIG. 2. The optical system 12 includes one or more light modules to provide high and low beam illumination patterns. High luminance LEDs may be included in the one or more light modules. A high luminance LED refers herein to an LED or light source having a luminance of about 85 $cd/mm^2$ or greater. Typically, low beam illumination is used whenever another vehicle is on the road directly ahead of motor vehicle and/or whenever another vehicle is approaching motor vehicle from an opposite direction.

The optical system 12 may include a first low beam module 100, a second low beam module 200, and a high beam module 300. In one implementation, the first low beam module 100, the second low beam module 200, and the high beam module 300 are projector type lighting modules. For example, the first low beam module 100 is a kink low beam module. The second low beam module 200 is a flat low beam module. The one or more lighting modules of the optical system have a lens height of 20 mm or less. In one example, the first low beam module 100, the second low beam module 200, and the high beam module 300 have a lens height of 15 mm.

The first low beam module 100 is one or more low beam modules that provide a beam pattern having a cut-off profile known by the term "kink" or "elbow. The second low beam module 200 may be one or more low beam modules that provide a spread beam pattern.

The modules described herein may be adapted based on available packaging and to meet customers' new requirements (styling, optical performances). Each of the modules described herein may be a stand-alone module. In other implementations, two modules may be implemented as a single module. For example, the first low beam module and the second low beam module may be implemented as a single low beam module.

Figure 3A:
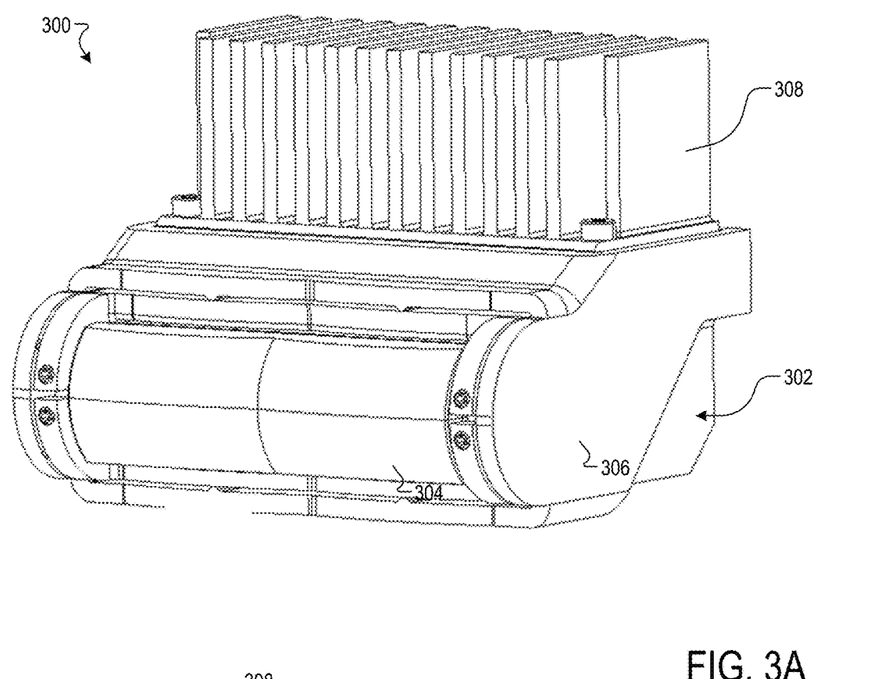
FIG. 3A is a perspective view of a high beam module according to one example.
Figure 3B:
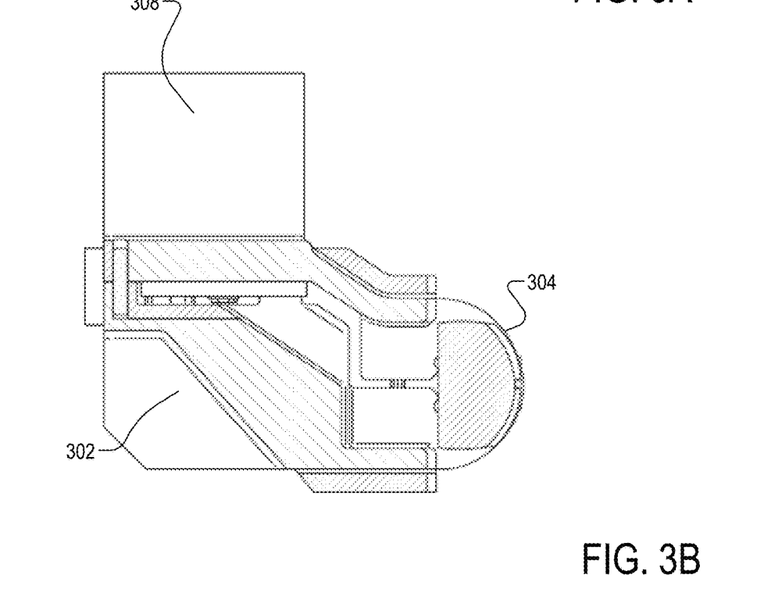
FIG. 3B is a cross-section view of the high beam module according to one example.
Figure 3C:
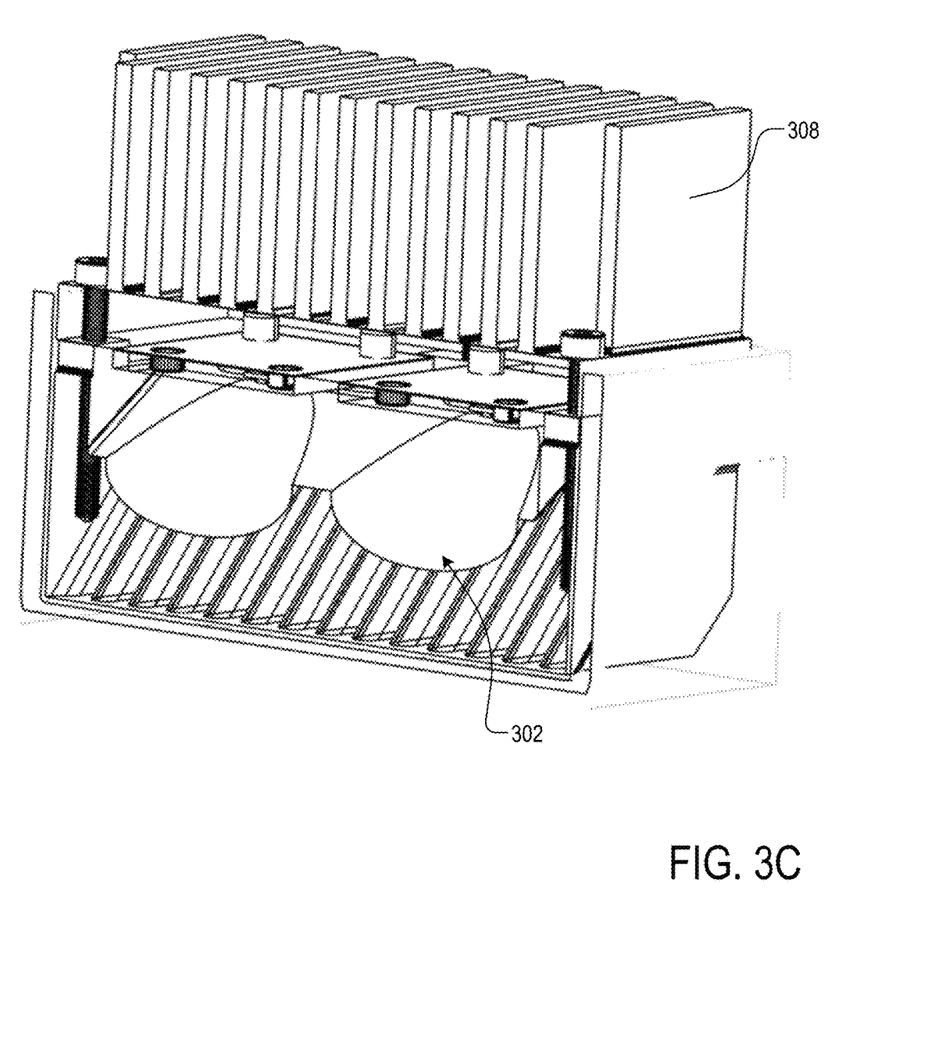
FIG. 3C is a cross-section view of the high beam module according to one example.

FIG. 3A is a perspective view of the high beam module 300 according to one example. The high beam module 300 may include one or more high luminance LEDs (not shown). The high beam module 300 can be one or more modules configured to generate a high beam illumination. For example, a high beam module may include a single high luminance LED or may include multiple high luminance LEDs. The optical system 12 may include one or more high beam modules, each of the high beam modules including one or more high luminance LEDs. The high beam module 300 provides high beam illumination for maximum intensity regulation and following customer requirements. The high beam module 300 includes a reflector 302, a lens 304, a housing or enclosure 306, and a heat sink 308. FIG. 3B and FIG. 3C are cross section views of the high beam module 300.

The lens 304 is made of polymethyl methacrylate (PMMA), polycarbonate (PC), silicone, glass, or thermoplastic material for example. However, other materials and dimensions of segments are contemplated by embodiments described herein. A single continuous lens 304 and reflector 302 are shown in FIGS. 3A and 3B. However, separate reflector segments are also contemplated by embodiments described herein.

Figure 4A:
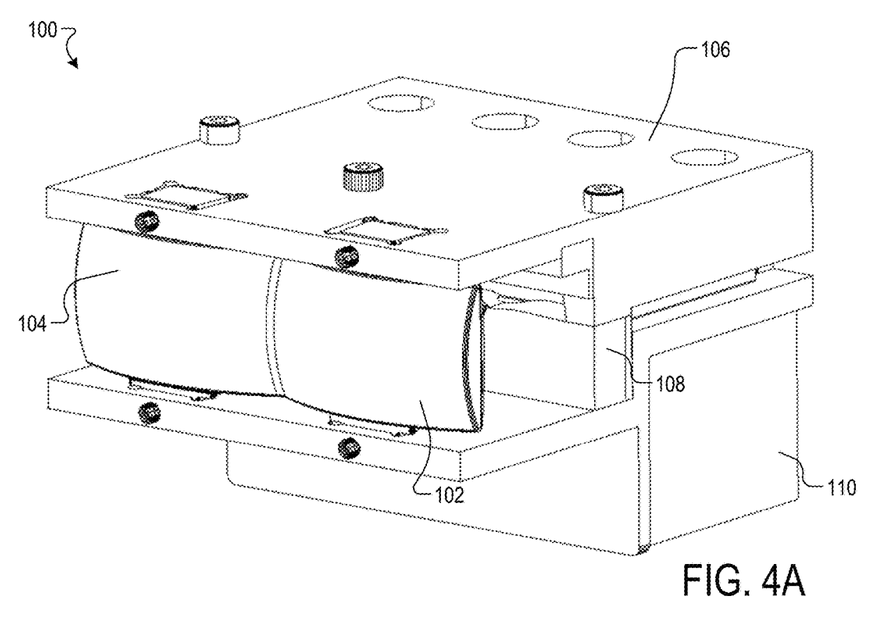
FIG. 4A is a perspective view of a first low beam module according to one example.
Figure 4B:
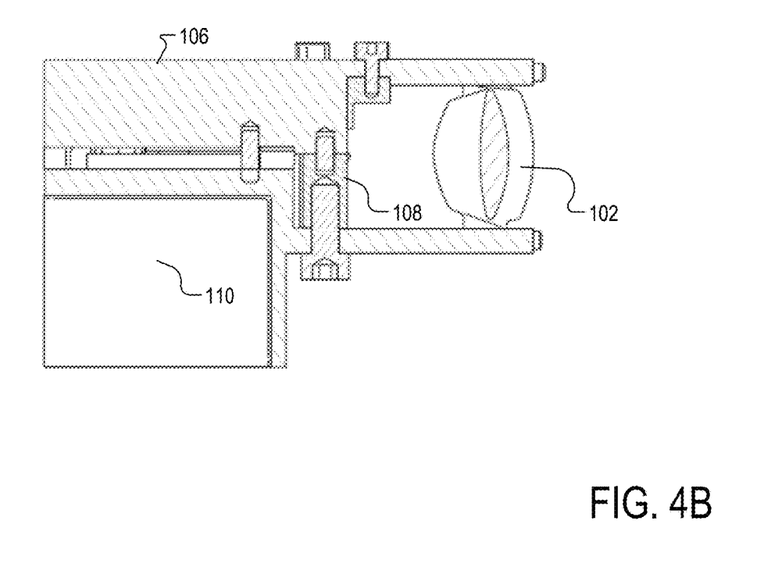
FIG. 4B is a cross-section view of the first low beam module according to one example.
Figure 4C:
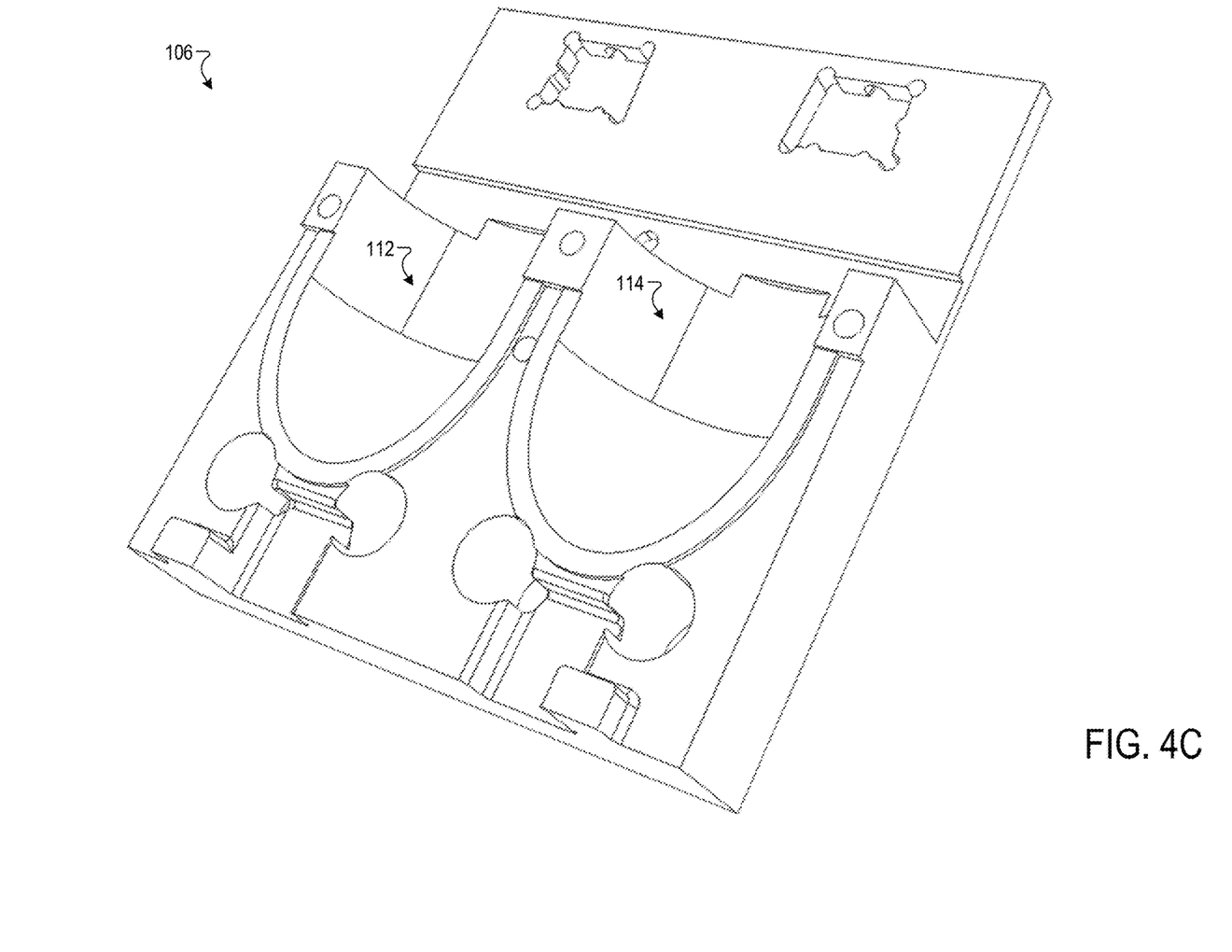
FIG. 4C is a schematic that shows a reflector of the first low beam module according to one example.
Figure 4D:
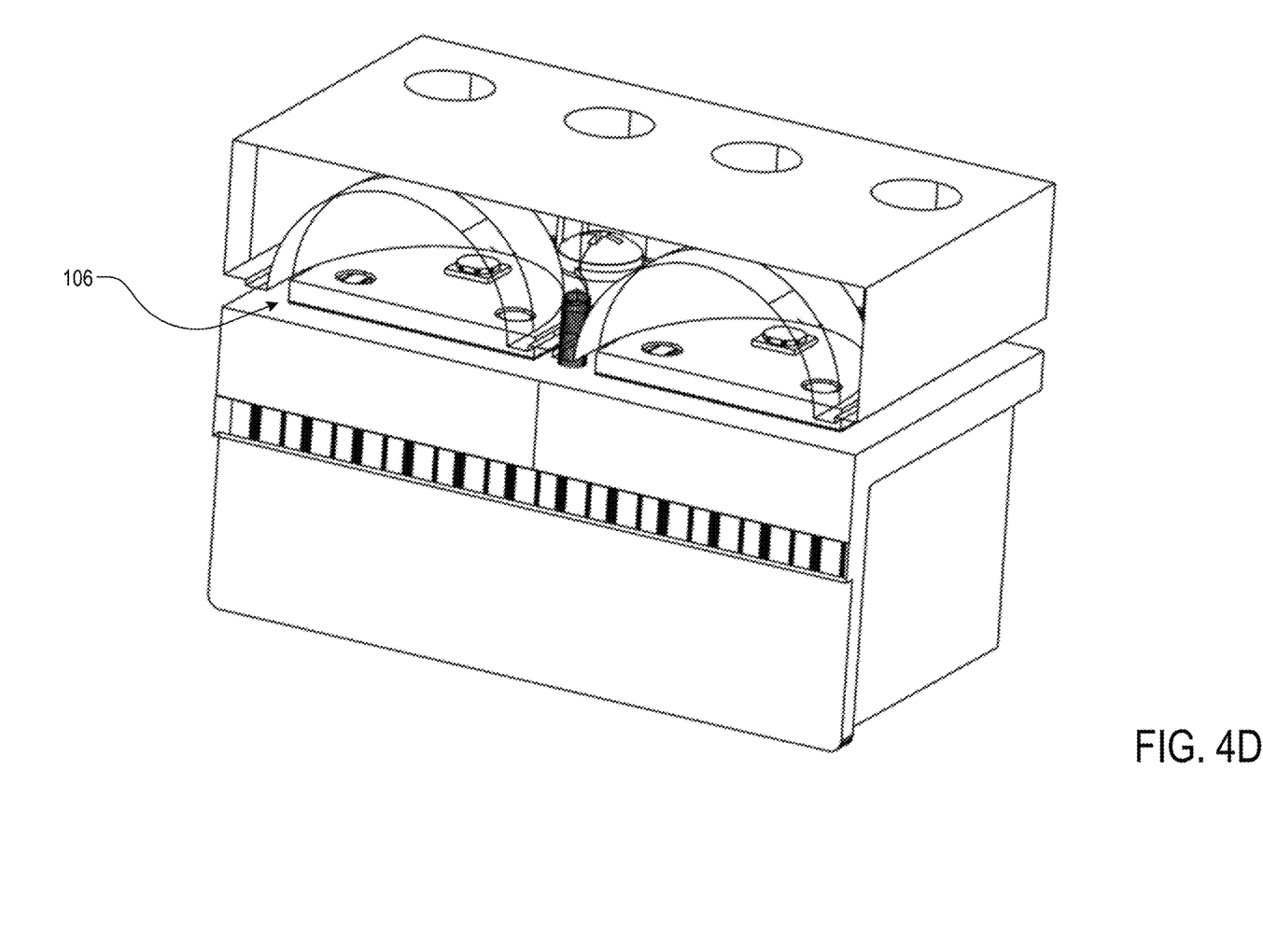
FIG. 4D is a cross-section view of the first low beam module according to one example.

FIG. 4A is a perspective view of the first low beam module 100 according to one example. The first low beam module may include lenses 102, 104, a reflector 106, a folder 108, a heat sink 110. Cross-sectional views of the first low beam module 100 are shown in FIG. 4B and FIG. 4D. FIG. 4C is a schematic that shows the reflector 106 according to one example.

The first low beam module 100 may include one or more high luminance light emitting diodes (LEDs) (not shown). As described previously herein, the first low beam module may include one or more low beam modules, each of the low beam modules including one or more high luminance LEDs. The first low beam module 100 may include two or more high luminance LEDs based on the requirement. The first low beam module 100 or kink provides a "hot spot" for the low beam maximum intensity regulation target.

The reflector 106 may include a first optical cavity 112 including a first high luminance LED and a second optical cavity 114 including a second high luminance LED as shown in FIG. 4C. The first optical cavity 112 and the second optical cavity 114 may be identical. In contrast, a kink module using standard LEDs may include 4 or more LEDs to achieve the same performance.

The folder 108 has a material with a reflectivity in the range of about 0.8 to about 0.97. The lenses 102, 104 are made of heat resistant polymethyl methacrylate (PMMA), polycarbonate (PC), silicone, glass, or thermoplastic material for example. However, other materials and dimensions of segments are contemplated by embodiments described herein.

Figure 5A:
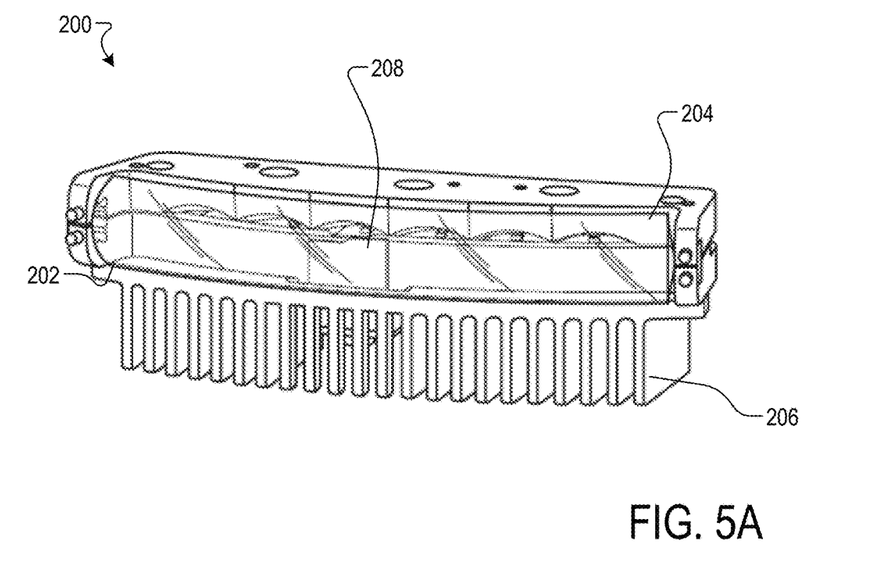
FIG. 5A is a perspective view of a second low beam module according to one example.

FIG. 5A is a schematic that shows the second low beam module 200 or flat according to one example. The second low beam module 200 may include one or more standard light sources. The second low beam module 200 or flat module functions to bring flux on the road and achieve spread. Examples of light sources include, but are not limited to semiconductor light-emitting diodes (LEDs), organic light-emitting diodes (OLEDs), polymer light-emitting diodes (PLEDs), and monolithic light-emitting diodes (MLEDs). In one implementation, the light sources may be high luminance LEDs. In one implementation, the light sources may have a luminance lower than the high luminance LEDs of the first low beam module 100. The optical system of the second low beam module 200 is adapted for a 20 mm height lens or less. In one implementation, the second low beam module 200 may be one or more modules each including a light source. In one implementation, the second low beam module 200 may include six LEDs.

Figure 5B:
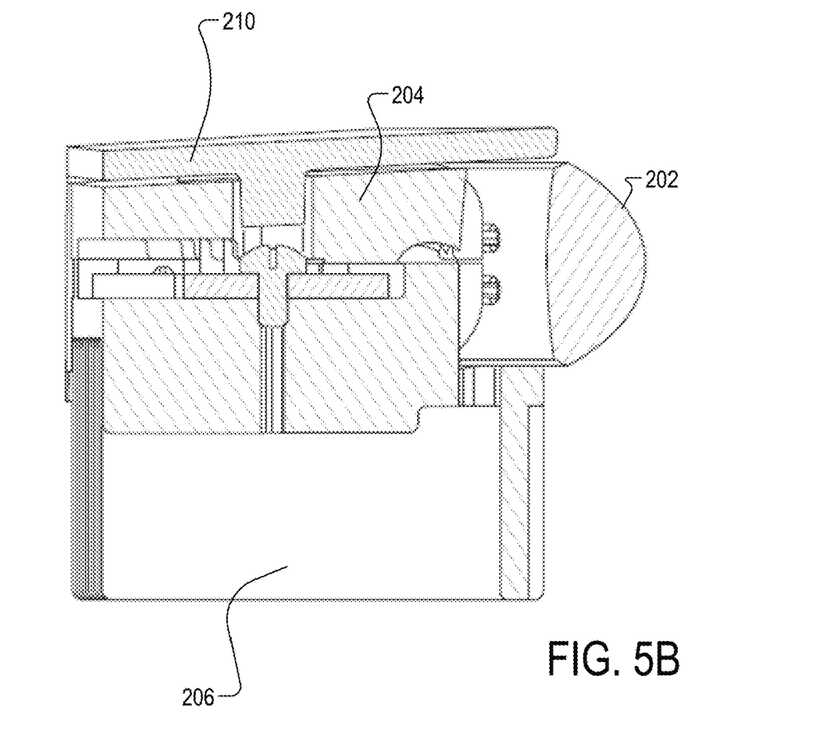
FIG. 5B is a cross-section view of the second high beam module according to one example.
Figure 5C:
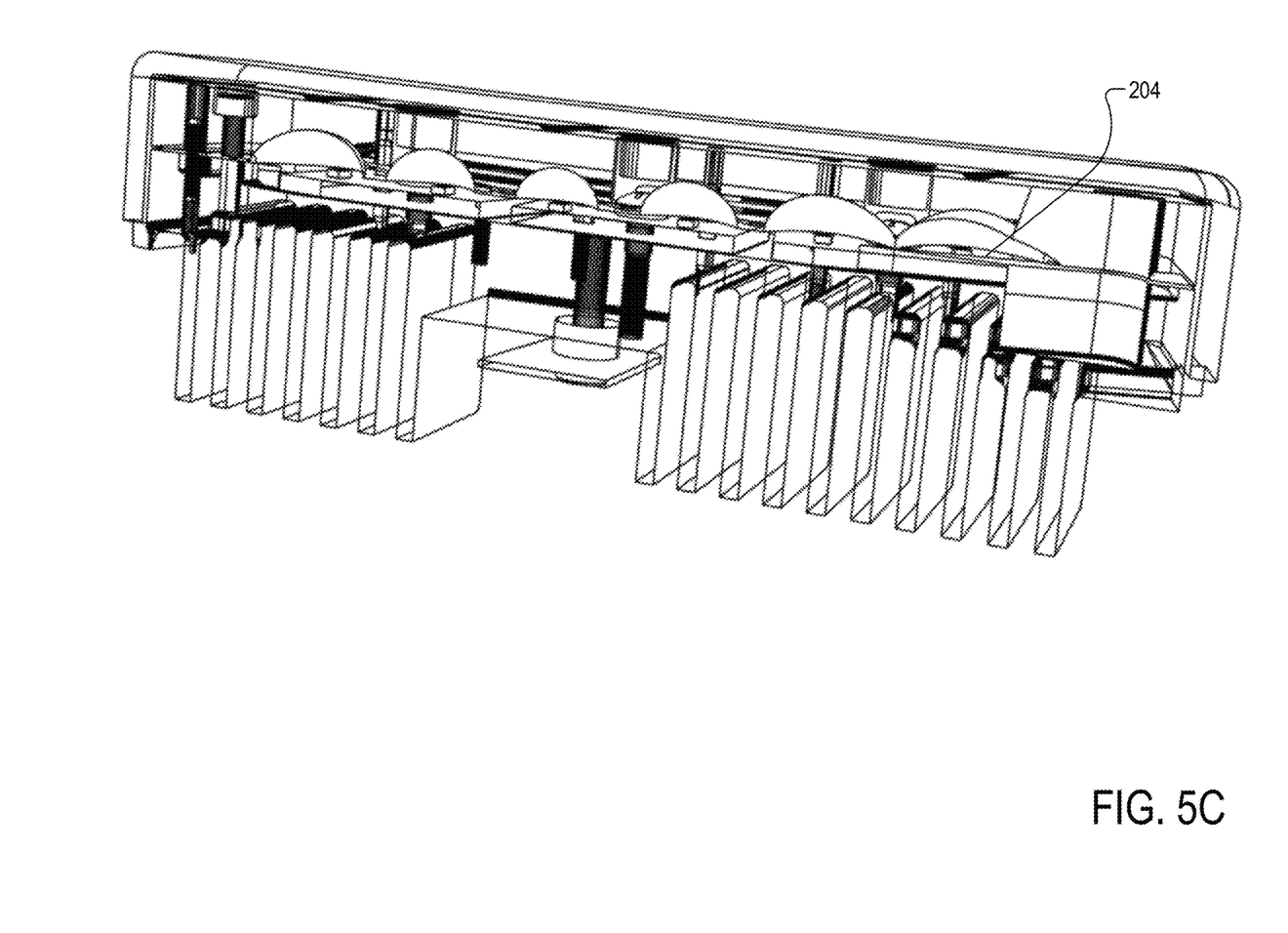
FIG. 5C is a cross-section view of the second high beam module according to one example.

The second low beam module 200 includes a lens 202, a reflector 204, a housing 210, a heat sink 206, and a file 208. A single continuous lens 202 and folder 208 are shown in FIG. 5A and FIG. 5B. However, separate reflector segments and lenses are also contemplated by embodiments described herein. For example, each of the LEDs may be included in a separate module. FIG. 5B and FIG. 5C show cross-sectional view of the second low beam module.

The optical system for each of the modules has a short focal length compared to conventional optical systems used in headlamps. The focal length is a function of the desired optical height of the lenses. The focal length of the optical system for each module may be less than 6 mm. In one implementation, the focal length may be less than 5 mm. The focal length of the optical system for each of the first low beam module 100, the second low beam module 200, and the high beam module 300 may be in the range of from about 2 mm to about 6 mm, or in the range of from about 2.5 mm to about 4.5 mm, e.g., about 3 mm, 3.2 mm, 3.4 mm, 3.6 mm, 3.8 mm, 4 mm, 4.2 mm, 4.4 mm, 4.6 mm, 4.8 mm, or 5 mm.

In one example the optical system 12 may have a total width of 330 mm. The total width of the optical system 12 is a function of each of the light modules.

During IHHS testing, glare for oncoming vehicles is measured from low beams. The maximum luminous (photometric) intensity at the test point is 12,000 cd. A sharper cut-off is desired for improved aim tolerance.

The low beam modules described herein have an adapted beam shape to provide a maximum target of 10,000 cd (for safety margin) at the test point after re-aim if needed. Further, the cut off line of the low beam is aligned with the horizontal line with a maximal gap of 0.2 degrees below the horizontal line. The low beam modules have a high performance on all other test points.

Figure 8:
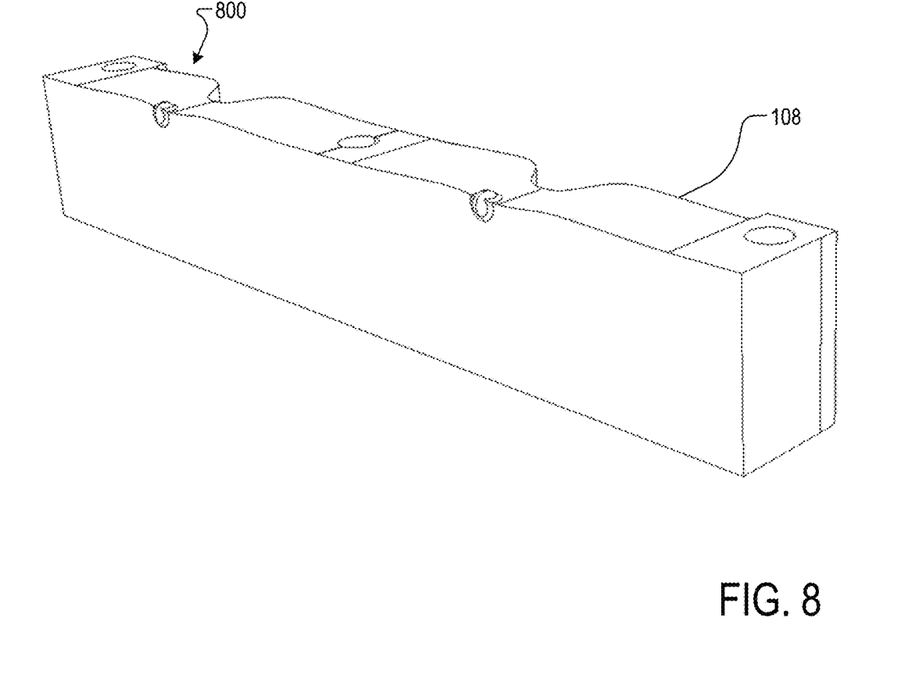
FIG. 8 is a schematic that shows a folder of the second low beam module according to one example.

FIG. 8 is a schematic that shows the folder 108 of the first low beam module 100 according to one example. The first low beam module 100 or kink module includes a bump 800 on the folder 108 to create a notch in the beam pattern at the test point (i.e., 0.86D-3.5L) for better IIHS rating. In contrast, without the bump on the folder there would be a need to re-aim the beam and therefore lose light downroad and increase the IIHS demerit. The bump 800 may have a spherical shape. In other implementation, the bump 800 may have a triangular shape. The bump shape and dimensions may be optimized based on the IIHS requirement.

In some embodiments, the notch can be located substantially to the left of vertical axis V. In other embodiments, the notch can be positioned symmetrically around the vertical axis V. Placement of the notch is generally dependent on the particular safety requirements and user preferences that do not conflict with the safety requirements.

Figure 9:
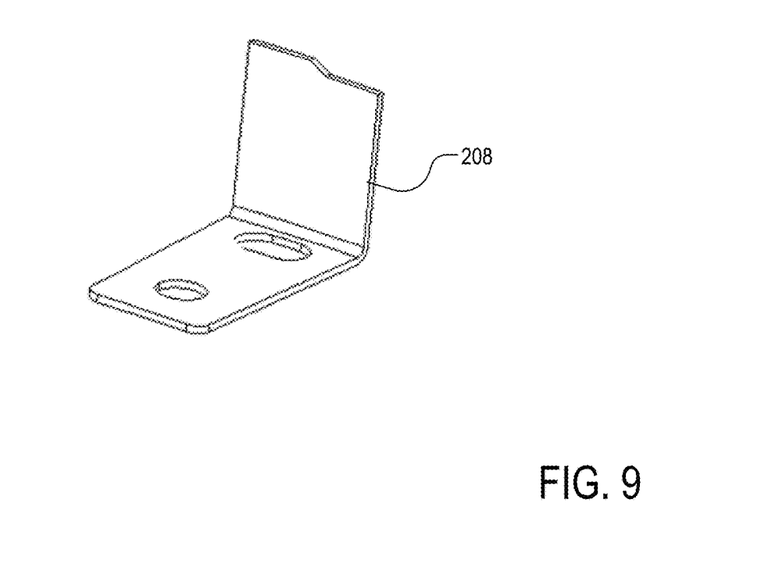
FIG. 9 is a schematic that shows a file of the second low beam module according to one example.

FIG. 9 is a schematic that shows the file 208 of the second low beam module 200 according to one example. The file 208 may have a step shape.

In one implementation, a tip up is implemented for all low beam modules of the headlamp assembly 10 (e.g., the first low beam module 100 and the second low beam module 200). The tip up provides a 1 to about 1.5 degrees up when switching to high beam to improve the IIHS demerit. The IIHS is improved by 5 demerits. The tip up provides additional intensity on the maximum intensity point for downroad vision.

Photometric simulation of the low beam modules with IIHS countermeasure for optimized score (i.e., flat module equipped with a file (position is optimized in front of the cavity illuminating the test point) and kink module having a folder equipped with a bump) were performed. The test point 0.86D-3.5L is indicated by 600 in FIG. 6A.

Figure 6A:
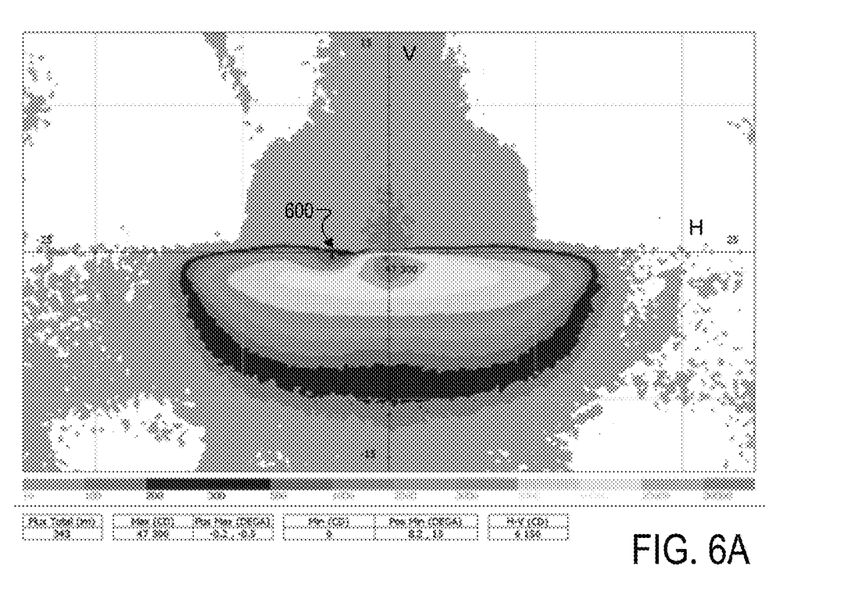
FIG. 6A is a schematic that shows an exemplary luminous intensity distribution of the first low beam module according to one example.

FIG. 6A is a schematic that shows an exemplary luminous intensity distribution of the first low beam module 100 according to one example. The horizontal axis H and vertical axis V identify horizontal and vertical planes intersecting both the center of the headlamp and the screen. The horizontal axis H and vertical axis V shown in FIG. 6A include tick marks spaced at 2° intervals. The maximum intensity is located at a position of −0.2 degrees along the horizontal axis and −0.5 degrees along the vertical axis. The maximum intensity illustrated is 47300 cd having a total lumen flux of 343.

Figure 6B:
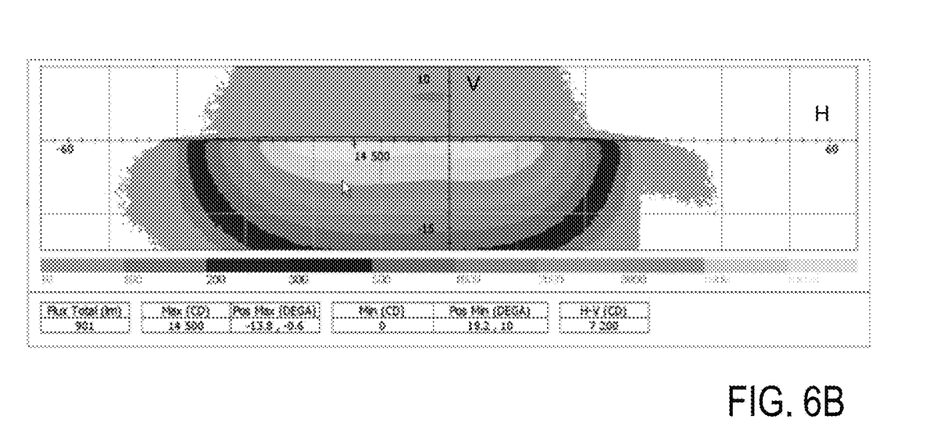
FIG. 6B is a schematic that shows an exemplary luminous intensity distribution of the second low beam module according to one example.

FIG. 6B is a schematic that shows an exemplary luminous intensity distribution of the second low beam module 200 according to one example. The horizontal axis H and vertical axis V shown in FIG. 6B include tick marks spaced at 2° intervals. The maximum intensity is located at a position of −13.8 degrees along the horizontal axis and −0.6 degrees along the vertical axis. The maximum intensity illustrated is 14500 cd having a total lumen flux of 901.

Figure 6C:
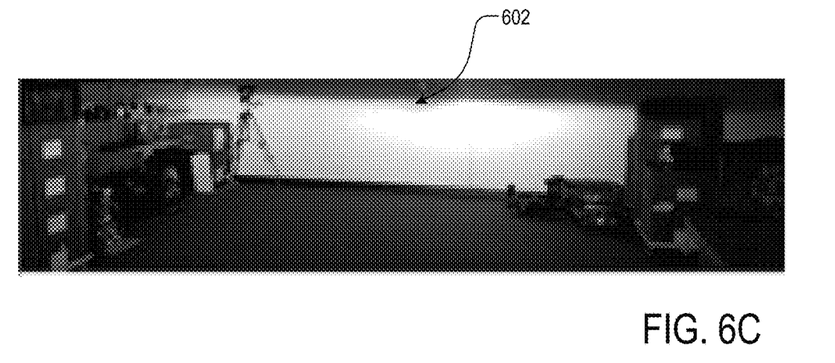
FIG. 6C is a schematic that shows an exemplary luminous intensity distribution of the combined low beam modules projected on a test surface (wall) according to one example.

FIG. 6C is a schematic that shows the notch 602 to adapt the light level at the test point. The light pattern is seen at a screen (wall) spaced from, and parallel to, the front (emitting) face of the low beam modules. The countermeasures (i.e., bump and the file) reduce the light emission around the test point. The countermeasures can allow headlamp assembly 10 to yield improved IIHS ratings, while still meeting the requirements of FMVSS No. 108.

Figure 7:
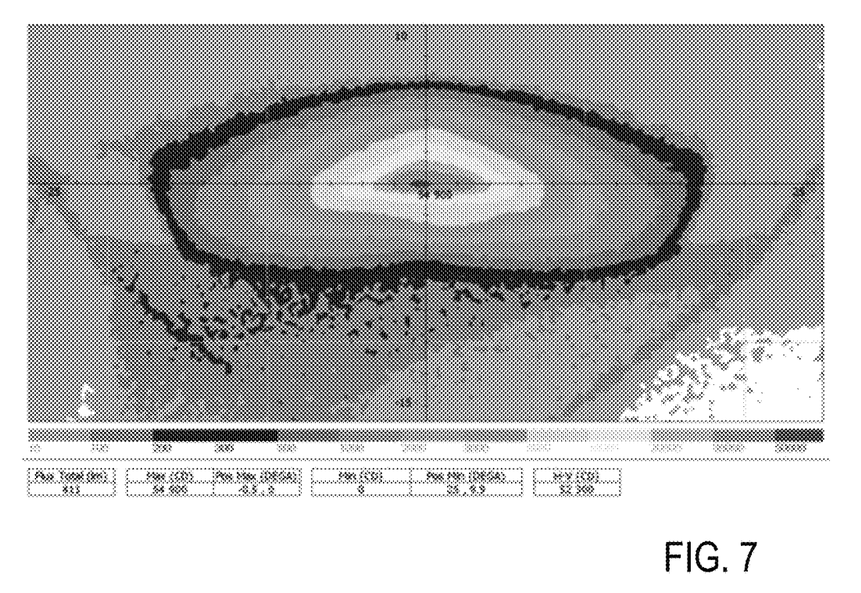
FIG. 7 is a schematic that shows an exemplary luminous intensity distribution of the high beam module according to one example.

FIG. 7 is a schematic that shows an exemplary luminous intensity distribution of the high beam module 300 according to one example. The horizontal axis H and vertical axis V shown in FIG. 7 include tick marks spaced at 2° intervals.

The maximum intensity is located at a position of −0.5 degrees along the horizontal axis and 0 degrees along the vertical axis. The maximum intensity illustrated is 54900 cd having a total lumen flux of 411.

The modules described herein may be controlled via one or more control circuits.

Figure 10:
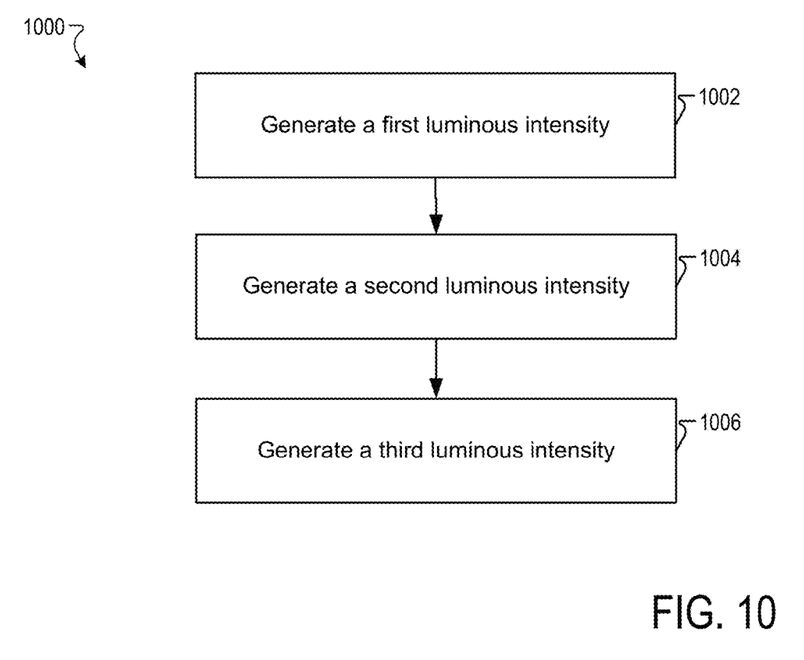
FIG. 10 is a flowchart for a method of generating a hybrid luminous intensity distribution according to one embodiment.

FIG. 10 is a flowchart for an exemplary method 1000 of generating a luminous intensity distribution. In step 1002, a first luminous intensity distribution is emitted, via a first low beam module including two or more high intensity LEDs. The first low beam module has a short focal length. In one embodiment, the first luminous intensity distribution includes a maximum intensity hot spot region.

In step 1004, a second luminous intensity distribution is emitted via a second low beam module including one or more LEDs. The first luminous intensity distribution differs from the second luminous intensity distribution. In one embodiment, the second luminous intensity distribution includes a concentrated intensity hot spot region and a larger spread distribution compared to the first luminous intensity distribution.

In step 1006, a third luminous intensity distribution is emitted, via a high beam module including two or more high intensity LEDs.

While certain embodiments have been described herein, these embodiments are presented by way of example only, and are not intended to limit the scope of the disclosure. Using the teachings in this disclosure, a person having ordinary skill in the art can modify and adapt the disclosure in various ways, making omissions, substitutions, and/or changes in the form of the embodiments described herein, without departing from the spirit of the disclosure. Moreover, in interpreting the disclosure, all terms should be interpreted in the broadest possible manner consistent with the context. The accompanying claims and their equivalents are intended to cover such forms or modifications, as would fall within the scope and spirit of the disclosure.

The invention claimed is:

1. A headlamp assembly, comprising:
   a low beam assembly configured to generate a low beam distribution including
       a plurality of low beam modules including at least one high luminance source optically configured emit a first luminous intensity distribution and at least one light source optically configured to emit a second luminous intensity distribution; and
   a high beam assembly configured to generate a high beam distribution including
       one or more high beam modules, wherein a focal length of each optical system associated with the plurality of low beam modules and the one or more high beam modules is less than 6 mm.

2. The headlamp assembly of claim 1, wherein the first luminous intensity distribution includes a maximum intensity hot spot region.

3. The headlamp assembly of claim 1, wherein a second low beam module of the plurality of low beam modules includes a file.

4. The headlamp assembly of claim 1, wherein a first low beam module of the plurality of low beam modules includes a first high luminance source and a second high luminance source.

5. The headlamp assembly of claim 4, wherein the first low beam module includes a reflector having two optical cavities adapted to hold the first high luminance source and the second high luminance source.

6. The headlamp assembly of claim 1, wherein the at least one high luminance source is a high luminance light emitting diode.

7. A headlamp assembly, comprising:
   a low beam assembly configured to generate a low beam distribution including
       a plurality of low beam modules including at least one high luminance source optically configured emit a first luminous intensity distribution and at least one light source optically configured to emit a second luminous intensity distribution; and
   a high beam assembly configured to generate a high beam distribution including
       one or more high beam modules, wherein a lens height associated with each module of the plurality of low beam modules and the one or more high beam modules is in a range from 1 mm to 20 mm.

8. A headlamp assembly, comprising:
   a low beam assembly configured to generate a low beam distribution including
       a plurality of low beam modules including at least one high luminance source optically configured emit a first luminous intensity distribution and at least one light source optically configured to emit a second luminous intensity distribution; and
   a high beam assembly configured to generate a high beam distribution including
       one or more high beam modules, wherein a first low beam module of the plurality of low beam modules includes a folder having a bump optimized based on regulation.

9. The headlamp assembly of claim 8, wherein the bump has a spherical shape.

10. The headlamp assembly of claim 8, wherein the bump has a triangular shape.

11. An optical system for a headlamp, comprising:
    a first optical system including at least one high luminance source optically configured to emit a first luminous intensity distribution;
    a second optical system including at least one source optically configured to emit a second luminous intensity distribution; and
    a third optical system configured to generate a high beam distribution, wherein a focal length of each of the first optical system, the second optical system, and the third optical is less than 6 mm.

12. The optical system of claim 11, wherein the first optical system includes a folder having a bump.

13. The optical system of claim 12, wherein the bump has a spherical shape.

14. The optical system of claim 12, wherein the bump has a triangular shape.

15. The optical system of claim 11, wherein the second optical system includes a file.

16. The optical system of claim 11, wherein the at least one source is a high luminance source.

17. A method of generating a hybrid luminous intensity distribution, the method comprising:
    emitting a first luminous intensity distribution via a high luminance source of a first low beam module;
    emitting a second luminous intensity distribution via at least one light source of a second low beam module; and
    emitting a third luminous intensity distribution via a high beam assembly, wherein a focal length of each of the first optical system, the second optical system, and the high beam assembly is less than 6 mm.

* * * * *